United States Patent [19]
Orzel

[11] 3,782,780
[45] Jan. 1, 1974

[54] BRAKE WARNING SWITCH REQUIRING RECENTERING PRESSURE

[75] Inventor: Edward S. Orzel, Cleveland, Ohio

[73] Assignee: The Weatherhead Company, Cleveland, Ohio

[22] Filed: July 26, 1971

[21] Appl. No.: 166,082

[52] U.S. Cl............. 303/6 C, 303/84 A, 340/52 C, 200/82 A
[51] Int. Cl.................... B60t 15/46, B60t 17/22
[58] Field of Search............... 73/419; 340/52 C; 92/5 R; 200/82 D, 82 A; 303/6 C, 84 A

[56] References Cited
UNITED STATES PATENTS

| | | | |
|---|---|---|---|
| 3,542,438 | 11/1970 | Falk | 340/52 C |
| 3,626,366 | 12/1971 | Tam | 340/52 C |
| 3,632,924 | 1/1972 | Harper | 340/52 C |
| 1,276,899 | 8/1918 | Gilling | 73/419 X |

Primary Examiner—Richard C. Queisser
Assistant Examiner—Daniel M. Yasich
Attorney—McNenny, Farrington, Pearne & Gordon

[57] ABSTRACT

A brake warning switch or other differential pressure sensing device has opposed pressure chambers in a housing to be connected to the fluid circuits of a dual brake system and includes a pressure responsive piston assembly shiftable from a centered position in the housing to generate a warning signal upon an abnormal pressure imbalance in the chambers. The piston assembly is arranged to automatically recenter itself when pressures are reestablished in the chambers and includes a pair of coaxial pistons of differing areas and associated ring seals at one chamber, at least, arranged to permit the differential area of the pistons, which determines the relative magnitude of the pressures necessary to recenter the pistons, to be selected so that the recentering pressure required is high enough to test the integrity of the fluid circuits.

7 Claims, 2 Drawing Figures

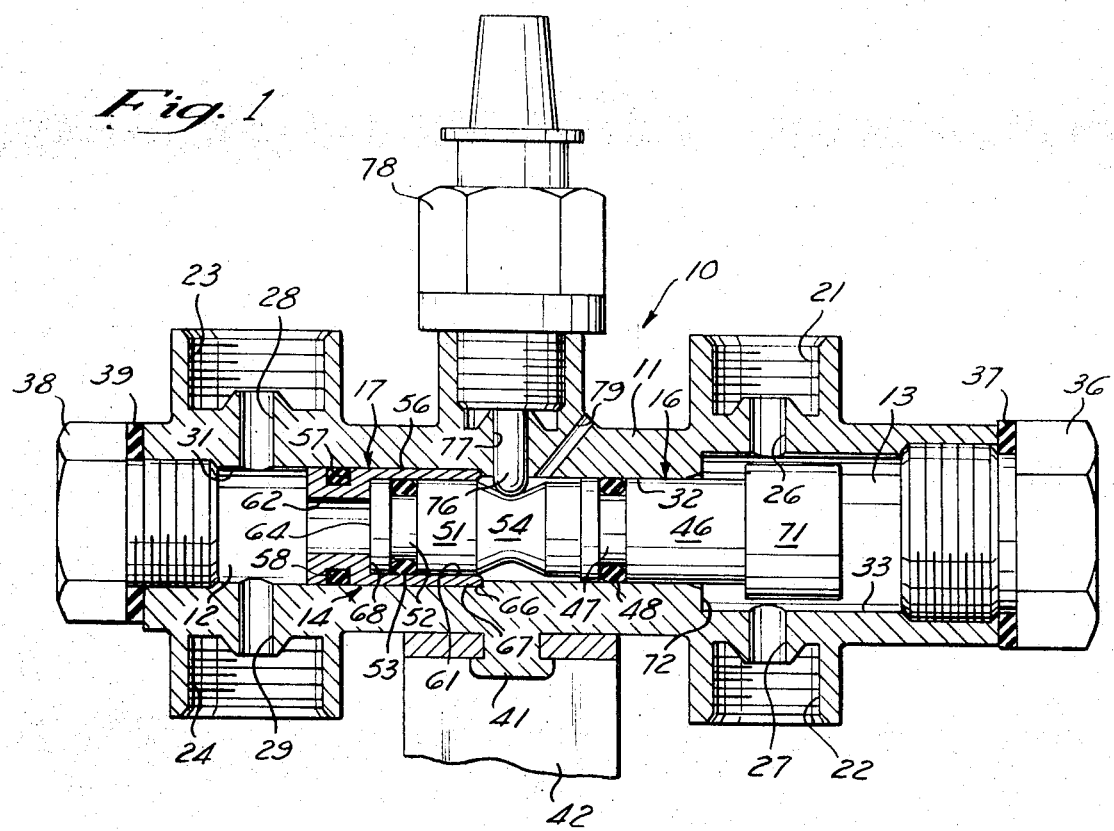

BRAKE WARNING SWITCH REQUIRING RECENTERING PRESSURE

BACKGROUND OF THE INVENTION

This invention relates to improvements in differential pressure sensing devices having means for indicating a pressure difference in two independent fluid circuits.

A device constructed in accordance with the invention is particularly suited for use in vehicle brake systems that utilize dual fluid circuits for control of slave brake actuators. Presently, automobiles, for example, may be provided with dual braking systems in which two generally independent hydraulic circuits are provided to brake the wheels of an automobile. Such dual braking systems are provided on automobiles to reduce the risk of a total brake failure and a resulting high risk to life and property.

With a failure in one of the dual circuits, the remaining circuit is still capable of slowing and stopping the vehicle. The braking action provided by only one operable circuit may be sufficiently effective under normal braking situations that the operator may not become aware of the failure in one circuit. The full braking capacity of the vehicle, though, would no longer be available in an emergency. Moreover, subsequent failure of the remaining operable circuit would leave the vehicle without braking capability which is the condition that the dual system is intended to eliminate. For these reasons it is important to provide apparatus to warn the vehicle operator of a failure in one of the brake circuits.

One particular problem has been that prior art devices have generally been of two types. One type has had the switch actuating member spring centered so that it produces a warning signal only when the brakes are applied and a pressure differential exists. In the other type the actuating member remains in the actuated position and often is so difficult to reset that it is usually replaced, not only at greater cost but also with an attendant interference with the undamaged brake circuit. It has therefore been recognized or desired that the warning switch unit should automatically reset itself upon a return of a balanced pressure condition after repair of the faulty circuit.

SUMMARY OF THE INVENTION

The invention provides improvements in a brake failure warning device or other differential pressure apparatus which, after signaling a failure in one fluid circuit of a dual system is adapted to proof test a repair of the failure before it may be automatically reset to a normal condition.

According to the invention, the device may be conveniently arranged to remain in a failure signal condition until relatively high fluid pressure are sustained in the associated fluid circuits. The arrangement may require proof pressures sufficiently great to test or prove the quality of a repair before the failure signal may be automatically eliminated. This feature insures against improper and insufficient repairs made through either negligence or mistake.

The pressure sensing or warning device includes a pair of fluid pressure chambers each adapted to receive pressure signals from one of the circuits of a dual system. Pressure responsive means including pressure reaction areas communicating with the fluid chambers assumes a failure signal condition when a difference in pressure in the chambers reaches a certain value or range. The reset or proof pressure required for resetting the device to a normal signal condition is a function of the relative size of the pressure reaction areas of the fluid receiving chambers. According to the invention, there is no limitation on the relative sizes of the pressure reaction areas so that a suitable relationship between such areas may be used to determine the optimum reset pressure for any particular system.

BRIEF DESCRIPTION OF THE DRAWING

FIG. 1 is a longitudinal cross-sectional view of one embodiment of a pressure differential sensing device in accordance with the invention.

FIG. 2 is a longitudinal view, partially in section, showing a second embodiment of a pressure differential sensing device in accordance with the invention.

DESCRIPTION OF THE PREFERRED EMBODIMENTS

Referring now to the embodiment illustrated in FIG. 1, a pressure differential sensing device comprises, in its principal parts, a housing 11 having pressure receiving chambers 12 and 13 therein at opposite ends, and pressure responsive means 14 in the form of a piston assembly of telescoped coaxial pistons or spools 16 and 17 in its midportion. In reference to the embodiments of either FIG. 1 or FIG. 2, the designation hereinbelow of the juxtaposition of an assembly or a component as at the right side or the left side, for instance, is for the purposes of description and is not to be taken in a limiting or restrictive sense.

The housing 11, as illustrated, may be a generally H-shaped flat block having, at each side, pairs of threaded ports 21, 22 and 23, 24 adapted to receive connectors or fittings of a type well known to those familiar in the art. The ports 21–24 communicate with central bore portions of the housing 11 through transverse or radial holes 26, 27, 28 and 29 respectively. The central portion or interior of the housing 11 is formed with a longitudinal bore having portions 31, 32 and 33 of differing diameters for the reason set forth more fully hereinafter.

At the right end of the housing 11, the bore 33 is closed off by a threaded plug 36 and sealing gasket 37 to define the fluid pressure receiving chamber 13. Similarly, at the left end, the bore 31 is closed off by a threaded plug 38 and a sealing washer or gasket 39 to define the fluid pressure receiving chamber 12. An upset projection 41 on the lower side of the housing 11 secures a bracket 42 to the housing. The bracket 42 may be used to conveniently mount the device 10, for example, on the body or chassis of an automobile or other vehicle.

The piston 16 is an elongated member slidably disposed in the midportion 32 of the axial housing bore. A cylindrical section 46 of the piston 16 has a diameter slightly less than the diameter of the mid-bore portion 32 and is provided with a peripheral groove 47 therein for the reception of an O-ring 48. The annular O-ring member 48 and the various other O-rings described below are of a construction familiar to those skilled in the art and comprise a rubber or elastomeric or other resilient material adapted to sealingly engage, in a known manner, associated surrounding wall surfaces defining their working inside and outside diameters. Where necessary or desirable, circular sealing rings or members having a cross section other than that of the illustrated O-rings may be employed.

At its leftward end, the piston 16 includes a cylindrical section 51 having a diameter smaller than the diameter of the midsection 46. The smaller cylindrical section 51 also includes a groove 52 for carrying a resilient seal or O-ring 53 therein. Near its axial center, the smaller cylindrical section 51 is relieved to form a detent or cam groove 54. As illustrated, the detent 54 may have a hyperbolic profile so that its diameter increases along either axial direction from its axial center.

The other piston 17 is a tubular member and includes an outer cylindrical surface 56 slightly smaller than the diameter of the associated bore portion 31 to permit the piston 17 to slide therein. The piston 17 includes a peripheral groove 57 in which a resilient O-ring 58 is provided to sealingly engage, with its outer diameter, the wall of the bore 31. Internally, the piston 17 has a cylindrical bore 61 slightly larger in diameter than that of the associated section 51 of the elongated piston 16 to allow the pistons 16 and 17 to telescope. The outside diameter of O-ring 53 sealingly engages the cylindrical bore 61 of the piston 17. At its left, the piston 17 has an axial passage 62 extending from the pressure receiving chamber 12 to an end face 64 of the elongated piston 16. At the juncture of the leftward axial bore 31 and midbore 32 an annular generally radial surface 66 provides an abutment or stop against which a rightward or inner end 67 of the tubular piston 17 may bottom.

The end face 64 of the elongated piston 16 is adapted to bottom against a generally radial surface 68 at the juncture of the bore 61 and passage 62 of the tubular piston 17. Leftward motion of the elongated piston 16 is limited by the bottoming of an enlarged end portion 71 of the piston against a radial face 72 at the junction between the rightward housing bore 33 and the midhousing bore 32. Rightward motion of the piston 16 is limited by engagement of the enlarged cylindrical portion 71 with the threaded plug 36.

The position of the pistons 16 and 17 shown in FIG. 1 illustrate the normal condition of the device 10. By inspection and the discussion below, it may be understood that both the pistons 16 and 17 may be caused to move leftward in unison, or the elongated piston 16 may be caused to move towards the right. In either case, movement of the elongated piston 16 causes a pin or probe 76 to be moved radially outward from the housing bore 32. The pin 76 projects into the housing bore 32 through a radial hole 77 in the housing. Movement of the pin 76 is caused by camming action on the surface of the detent 54 as the piston 16 moves axially. The pin 76 may be arranged to actuate an electrical switch or other signal device in a threaded fitting 78 mounted on the housing 11. Movement of the pin 76 radially outward is thus adapted to signal the condition or position of the pistons 16 and 17.

A vehicle in which the device 10 may be employed as a brake failure warning switch, generally, will be provided with dual or tandem master hydraulic brake cylinders each controlling a set of brake slave cylinders at the brakes of the vehicle in a well known manner. The fluid circuit associated with one master cylinder portion may be connected with one of the fluid receiving chambers 12 or 13 while the circuit associated with the other master cylinder portion is connected with the other chamber 13 or 12 at the ports 21, 22, 23 and 24.

In its illustrated form, the housing 11 provides two ports 21 and 22 at its rightward side and two ports 23 and 24 at its leftward side. This arrangement is not necessary for the operation of the device but rather is a form convenient for use in a vehicle wherein it is desirable to make use of the device 10 as a terminal block for connecting fluid lines. It will be understood that it is only necessary to provide a single port at each chamber 12 and 13.

Commonly, dual braking systems are arranged to operate with substantially equal pressures in each circuit. With such a system, under normal circumstances when a vehicle's brakes are applied the fluid pressures in the opposed chambers 31 and 33, then, will be approximately equal. Accordingly, in the embodiments of FIGS. 1 and 2, the proportions of piston areas in each device are selected for use in a normally equalized pressure circuit. It may be understood, nevertheless, that the principles of the invention may be applied in systems where circuit pressures are generally not equal as occurs when the dual or tandem master cylinders have different diameters. If a rupture or other type of failure occurs within one of the circuits, the failed circuit will be generally incapable of maintaining braking pressure in its associated chamber 31 or 33 and will result in a pressure imbalance in the pressure sensing device.

At the left fluid chamber 12, the pistons 16 and 17, together, generally define a major circular piston or pressure reaction area equal to the cross-sectional area of the housing bore 31. A minor circular piston or pressure reaction area at the left chamber 12 is generally defined by the adjacent cylindrical portion 51 of the elongated piston 16 and is equal to the cross-sectional area of the cylindrical bore 61 of the tubular piston 17. At the other end of the housing 11, a piston or pressure reaction area generally defined by the cross-sectional area of the midsection 46 of the piston 16 and equal to the cross-sectional area of the housing bore 32 communicates with the fluid chamber 13. The diameter of the housing bore 31, as indicated, is slightly larger than the diameter of the mid-housing bore 32 while the internal bore 61 of the tubular piston 17 is smaller than the mid-housing bore 32.

Under a balanced pressure situation the resultant forces on the pistons 16 and 17 will be proportional to their pressure reaction areas. Since the major reaction area is defined by the pistons 16 and 17 at the left chamber 12, the resultant force on the piston assembly 14 is towards the right. Motion of the tubular piston 17, though, is limited by the abutment surface 66 so that the piston assembly 14 will normally remain in the position illustrated in FIG. 1.

If a failure in a fluid circuit connected to the right-hand chamber 13 occurs so that the pressure in this chamber is substantially less than that in the opposite chamber 12, the elongated piston 16 is driven to the right by fluid pressure operating on the minor pressure reaction area defined by the cylindrical section 51. The elongated piston 16 will move rightwardly until the enlarged portion 71 engages the threaded plug 36. During this rightward movement, the pin 76 will be cammed upwardly by the surface of the detent 54 until the pin 76 eventually rests on the cylindrical section 51. Thus, pressure loss through failure in a circuit connected to the right chamber 13 will be indicated by signal means operated by the pin 76. Conveniently, the signal may be the energization of an electrical warning lamp positioned in view of the operator of the vehicle.

Alternatively, failure in a fluid circuit connected to the lefthand fluid chamber 12 resulting in a loss of pressure therein will cause the pistons 16 and 17 to move leftwardly under the hydraulic force developed by pressure in the righthand chamber 13 against the area of the midsection 46. Motion of the elongated piston 16 to the left will, likewise, cause the pin 76 to be cammed upwardly along the surface of the detent 54 until the adjacent cylindrical surface 51 supports the pin 76. Leftward motion of the elongated piston 16 is limited when the enlarged cylindrical portion 71 abuts the radial surface 72 at the leftward end of the fluid chamber 13. Motion of the pin 76, again, generates or actuates a warning signal that a failure in a fluid circuit has occurred. It may be appreciated that the elongated piston 16 will remain in a displaced position either to the left or right of that illustrated, depending on which chamber 12 or 13 is connected to the failed circuit. At either displaced position, the elongated piston 16 will retain the pin 76 in a failure signal condition on a portion of the cylindrical surface 51.

It will be understood that the pistons 16 and 17 are arranged to automatically return to their illustrated centered or normal condition once the failure has been corrected and pressure is reapplied in the chambers 12 and 13. The pin 76 may be spring loaded in a downward position to return into the detent 54 and eliminate or deactuate the failure signal upon recentering of the piston 16.

Assuming the elongated piston 16 was displaced towards the right-hand chamber 13 because of a failure in its associated circuit, upon repair of the failure and the application of substantially equal pressures in both of the fluid chambers 12 and 13 the net fluid force on the elongated piston 16 would be to the left to return it to the centered position. This results because the pressure reaction area associated with the left chamber 12, namely, that defined by the cylindrical section 51 is less than the reaction area defined by the larger cylindrical section 46. When the pressure in the chambers 12 and 13 is sufficiently high, friction between the O-rings 52 and 48 and the surfaces which they sealingly engage and between the pin 76 and the cylindrical section 51 will be overcome and the elongated piston 16 will move leftward to the centered position.

Similarly, where the pistons 16 and 17 have moved to the left upon a failure of the fluid circuit associated with the left chamber 12, the pistons will be recentered upon a repair and application of equal pressures in both of the chambers 12 and 13. The net force on the elongated piston 16 is proportional to the difference between the major pressure reaction area defined by the pistons 16 and 17 at the left chamber 12 and the pressure reaction area defined by the elongated piston 16 associated with the right chamber 13. When the pressure in the chambers 12 and 13 acting against this difference in area is sufficiently high to overcome the friction of the O-rings 58 and 48 against their associated bores 31 and 32, respectively, and the friction of the pin 76 on the cylindrical section 51, the pistons 16 and 17 will be caused to move rightwardly into the normal condition. A small passage 79 is provided in the housing 11 to atmospherically vent the central portion of the bore 32 and thereby avoid a possible inoperative condition or hydraulic lock between the pistons 16 and 17 in the event of seal leakage into this bore 32.

The differences or relative size of the pressure reaction areas determined by the cylindrical bores 32, 31, and 61 are chosen with regard to the frictional forces generated by the O-rings 48, 53, 58, and the pin 76 resisting movement of the pistons 16 and 17. To return the piston 16 from the right, the difference in area between the area of the cylindrical inner bore 61 of the tubular piston 17 or minor pressure reaction area and the area of the cylindrical bore 32 must be large enough in relation to a desired proof or reset pressure to overcome the friction developed by the O-rings 48, 53 and the pin 76 resisting movement of the piston. Similarly, to return the pistons 16 and 17 from the left, the difference in area between the area of the cylindrical bore 32 and the area of the larger bore 31 or major pressure reaction area must be large enough in relation to the desired proof or reset pressure to overcome the friction developed by the O-rings 48 and 58 and the pin 76.

A relatively small area differential will require relatively high pressure levels for recentering. It may be appreciated that, in accordance with the invention, there is no restriction imposed by the physical arrangement of the pistons or O-rings, as to how small these differences in area may be made so that the pressure required to reset the device automatically may be made sufficiently high that it tests the quality of a repair.

In particular, the arrangement of the pistons 16 and 17 allows the difference in area between the major and minor pressure reaction areas to be smaller than the cross-sectional area of the O-ring 58, defined by the inside and outside diameters of the O-ring, since the inside diameter of the O-ring is not restricted by the diameter of the minor pressure reaction area and, as shown, is smaller than the latter.

FIG. 2 illustrates another embodiment of the invention having similar features to the above described embodiment of FIG. 1. As above, a differential pressure sensing device comprises a housing 111, opposed pressure receiving chambers 112 and 113, and pressure responsive means 114. The pressure responsive means 114 comprises a coaxial piston assembly including a central piston 116 and a pair of substantially identical outer tubular pistons 117. In all essential aspects, the components of the device 110 are symmetrical about a plane midway between the fluid chambers 111 and 113 and perpendicular to the plane of the drawing.

The housing 111 may be an H-shaped extrusion or block having flat sides parallel to the plane of the drawing. Threaded ports adapted to be connected to fluid circuits communicate with radial holes 121 which lead to the pressure receiving chambers 112 and 113. As in the embodiment of FIG. 1, only one hole 121 is necessary for each chamber 112 or 113. At the interior of the housing 111, there is provided a pair of coaxial longitudinal bores 126 of equal diameter. The longitudinal bores 126 are closed off at their outer ends by a pair of threaded plugs 127 to define the fluid pressure receiving chambers 112 and 113. At their inner ends, the longitudinal bores 126 terminate in generally radial abutment surfaces 128. A circular clearance hole 129 runs between these abutment surfaces 128 allowing the central piston 116 to extend therethrough.

The tubular pistons 117 are cylindrical in form and each includes an outer cylindrical surface 131, an inner cylindrical bore 132, and a circular fluid passage 133. On its outer periphery, each tubular piston 117 is provided with an annular groove 136 carrying an O-ring 137 which seals at its outer diameter against the associated housing bore 126. The diameter of the outer cylindrical surface 131 of the tubular pistons 117 is slightly smaller than the diameter of the housing bores 126 to permit the pistons to slide in these bores.

The central piston 116, preferably, has an outer cylindrical surface 139 interrupted near each end of the piston by an annular groove 141 and centrally by an annular detent 143. The outer cylindrical surface 139 has a diameter slightly less than the diameter of the inner bores 132 of the tubular pistons 131 to permit the central piston 116 to telescope freely with the tubular pistons 117. A face 142 at each end of the piston 116 abuts a generally radial surface 145 of the tubular pistons 117 at the base of the inner bores 132 when the pistons are in the illustrated centered position. An O-ring 144 is provided in each of the annular grooves 141 to seal, at its outer diameter, against the surrounding inner bore 132 of an associated piston 117.

A pin or probe 151 extends through a radial hole 152 in the housing 111 and signals movement of the central piston 116 through a set of electrical contacts or other signal means in a fitting 153 threaded into the housing 111. Rightward or leftward movement of the central piston 116 from the position illustrated in FIG. 2, causes the pin 151 to be cammed radially upward along the surface of the detent 143 until the pin rests on a portion of the cylindrical surface 139 of the piston.

The device 110 illustrated in FIG. 2 is adapted to sense a pressure imbalance in the chambers 112 and 113 in a manner similar to that described in connection with the embodiment of FIG. 1. When fluid pressure in the chambers 112 and 113 are substantially equal, the pistons 116 and 117 will remain in the positions illustrated in FIG. 2 since the pressures react on equal areas of the pistons at each chamber.

Upon a failure in a fluid circuit connected to one of the chambers 112 or 113, fluid pressure in the opposite chamber operating against the central piston 116 through the passage 133 of the tubular piston 117 causes the central piston 116 and the tubular piston 117 associated with the depressurized chamber 112 to move towards the latter chamber until the tubular piston abuts the adjacent threaded plug 127. At this point, the pin 151 rests on the cylindrical surface 139 of the central piston 116 at one side of the detent 143 and will remain in this state until fluid pressure is returned to the depressurized chamber.

After a repair of a failed circuit, return to a balanced pressure condition in both of the chambers 112 and 113 will cause the displaced tubular piston 117 and the central piston 116 to return to their normal conditions illustrated in FIG. 2. Renewed pressure in the depressurized chamber 112 or 113 operates on a major pressure reaction area, defined by the cross-sectional area of the housing bore 126 and is resisted by the fluid force in the opposite chamber 113 or 112 operating against a minor pressure reaction area defined by the interior bore 132 of the associated tubular piston 117. It should be understood that the tubular piston 117 not associated with the depressurized chamber remains in contact with its adjacent abutment surface 128 so that the fluid force on this tubular piston is not transmitted to the central piston 116 while it returns from its displaced position. A small passage or hole 155 is provided in the housing 111 to atmospherically vent the hole or bore 129 and thereby avoid a possible inoperative condition or hydraulic lock between the tubular pistons 117 in the event of seal leakage into this bore 129.

It may thus be appreciated that the net or resultant fluid force on the central piston 116 tending to return it to its normal or centered condition is proportional to the difference between the major pressure reaction area, defined by the cross-sectional area of the housing bore 126, and the minor pressure reaction area defined by the internal bore 132 of the tubular pistons 117. This hydraulic force must overcome the friction between the O-ring 137 of the displaced tubular piston 117 and the housing bore 126, the friction between the O-ring 144 and the internal bore 132 of the undisplaced tubular piston 117, and the friction of the pin 151 on the outer surfaces of the central piston 116. According to the invention, this differential area between the major and minor pressure reaction areas may be selected, by properly proportioning the various elements of the device 110 so that a substantial pressure in the chambers 112 and 113 is required to overcome the frictional resistance. With a proper selection of differential area, the integrity of a repair in a failed circuit may be made automatically before the pistons 116 and 117 return to their normal condition. In this embodiment, as in the embodiment of FIG. 1, the arrangement of the pistons 116 and 117 allows the difference in area between the major and minor pressure reaction areas to be smaller than the cross-sectional area of the O-ring 137, defined by the inside and outside diameter of the O-ring since the inside diameter of the O-ring is not restricted by the diameter of the minor pressure reaction area and, as shown, is smaller than the latter.

Although preferred embodiments of this invention have been illustrated, it is to be understood that various modifications and rearrangements of parts may be resorted to without departing from the scope of the invention disclosed and claimed herein.

What is claimed is:

1. A differential pressure sensing device comprising a housing, first and second fluid pressure receiving chambers each adapted to be connected to a separate source of fluid pressure, pressure responsive means in said housing, said pressure responsive means providing at said first chamber major and minor circular pressure reaction areas defined by major and minor piston diameters, a first annular sealing member sealing the periphery of the major circular reaction area of the major piston diameter, a second annular sealing member sealing the periphery of the minor circular reaction area of the minor piston diameter, said first and second sealing members each being independent in size relative to the respective piston diameter of the other, said pressure responsive means providing at said second chamber a pressure reaction area having a predetermined relation to the pressure reaction areas associated with the first chamber, said pressure responsive means being sensitive through said reaction areas to fluid pressures in said chambers, said pressure responsive means including means to actuate a signal detectable externally of said housing and operable when the pressure in said chambers change substantially from a normal relationship therebetween and to self-maintain said signal after the substantial change in pressure relationship is eliminated, said pressure responsive means including means to deactuate said signal, said signal deactuating means requiring predetermined reset pressures having magnitudes generally inversely proportional to the difference in size of the sealing diameters of said first and second sealing members supplied at said chambers.

2. In a brake failure warning device for use in a vehicle having dual fluid brake circuits including a housing, a pair of fluid pressure receiving chambers in said housing, means to connect each of the fluid circuits to one of said chambers, a passage in said housing extending between said chambers, a pair of coaxial pistons in said passage and communicating with a first one of said chambers, one of said pistons defining a circular major pressure reaction area and the other piston defining a minor circular pressure reaction area smaller than said major area, said pistons each defining a normally centered position in said housing, said major area piston being limited to axial movement from said centered position towards said first chamber and back to said centered position, said minor area piston being axially reciprocal towards and away from both of said chambers, piston means associated with a second one of said chambers causing pressure in the second chamber to force said pistons towards said first chamber upon loss of fluid pressure in said first chamber, means to sense movement of said pistons and produce a warning signal externally of said housing, renewal of pressure in said first chamber causing a return of said pistons away from said first chamber to said centered position, said piston means resisting return movement of said pistons from said first chamber towards said centered position, said piston means providing a pressure reaction area at said second chamber of a predetermined size in relation to the normal pressure in said second chamber such that the pressure-area product therein is not less than the product of said minor area and the normal pressure in said first chamber and is not greater than the product of the major area and the normal pressure in said first chamber, the improvement comprising separate sealing means associated with said major and minor area pistons including sealing ring means permitting selection of the size differential of said major and minor areas substantially independent of the configuration of said sealing ring means whereby said size differential may be selected sufficiently small to require substantial pressures to be introduced into said chambers before said pistons are caused to return to their centered condition from said first chamber.

3. A brake warning device as set forth in claim 2, wherein said sealing ring means is associated with said minor area piston and said ring means has an outer diameter equal to the diameter of said minor area.

4. A brake warning device as set forth in claim 3, wherein said sealing means includes a second sealing ring associated with said major area piston.

5. A brake warning device as set forth in claim 2, wherein said piston means associated with said second chamber provides a pressure reaction area having a size intermediate to that of said minor area and said major area.

6. A brake warning device as set forth in claim 2, wherein said piston means of said second chamber comprises a pair of coaxial pistons providing major and minor pressure reaction areas substantially the same in size as said major and minor areas associated with said first chamber.

7. A differential pressure sensing device comprising a housing, first and second fluid pressure receiving chambers each adapted to be connected to a separate source of fluid pressure, pressure responsive means in said housing, said pressure responsive means providing at said first chamber major and minor circular pressure reaction areas defined by major and minor piston diameters, first and second separate means for sealing said major and minor piston diameters respectively, said first and second means for sealing each being independent in size relative to the respective piston diameter of the other, said pressure responsive means providing at said second chamber a pressure reaction area having a predetermined relation to the pressure reaction areas associated with the first chamber, said pressure responsive means being sensitive through said reaction areas to fluid pressures in said chambers, said pressure responsive means including means to actuate a signal detectable externally of said housing and operable when the pressures in said chambers change substantially from a normal relationship therebetween and to self-maintain said signal after the substantial change in pressure relationship is eliminated, said pressure responsive means including means to deactuate said signal, said signal deactuating means requiring predetermined reset pressures having magnitudes generally inversely proportional to the difference in size of the sealing diameters of said first and second means for sealing supplied at said chambers.

* * * * *